Patented Mar. 22, 1932

1,850,224

UNITED STATES PATENT OFFICE

WILLARD DE C. CRATER, OF SUCCASUNNA, NEW JERSEY, ASSIGNOR TO HERCULES POWDER COMPANY, OF WILMINGTON, DELAWARE, A CORPORATION OF DELAWARE

COMPOSITION OF MATTER

No Drawing.    Application filed July 3, 1929. Serial No. 375,887.

My invention relates to a new composition of matter, more particularly comprising quebrachitol nitrate, and to a novel explosive including quebrachitol nitrate as an ingredient.

Quebrachitol, $C_6H_6(OH)_5(OCH_3)$, the monomethyl ether of 1-inositol is found, as is known, for example, in quebracho bark and in rubber latex from which it is obtained in large quantities, as a waste by-product.

Now, in accordance with my invention, I have discovered that quebrachitol as such may be nitrated, desirably, for example, to quebrachitol pentanitrate, and further that it may be nitrated in conjunction, as in admixture, with glycerin, or alternatively with the several glycols.

Quebrachitol nitrate may be readily produced by the ordinary methods of nitrating with mixed acids and will be readily separated from the nitrating acids and neutralized. The product will have a high nitrogen content as compared with theoretical, will afford an excellent explosive and will exert an advantageous solvent power on certain grades of nitrocellulose.

Quebrachitol nitrate, as for example, quebrachitol pentanitrate, is a colorless, heavy, viscous liquid, odorless and very soluble in ether, methyl and ethyl alcohol, and glacial acetic acid. It is insoluble in water and with difficulty soluble in concentrated sulphuric acid.

Quebrachitol nitrate, from the standpoint of an explosive, has the characteristics of flashing without exploding when dropped on a hot plate and of detonating when struck with a hammer on a steel plate or with a No. 6 blasting cap. The substance also will detonate under the impact of a 2000 g. weight at 4 cm. and will fail to detonate under the impact of the same weight at 3 cm.

Quebrachitol, as has been indicated, may be nitrated in conjunction with glycerin, or the several glycols for the production of nitrated quebrachitol-glycerin which will have greater viscosity than nitrated glycerine of the same grade and less viscosity than nitrated glycerin containing, for example, cane sugar in place of quebrachitol. The nitrated quebrachitol-glycerin, say produced from a mixture of 20% quebrachitol and 80% glycerin, will be stable, having a pH value of 7.0 and a KI (stability) test at 82.2° C. of eight minutes.

Quebrachitol nitrate may be produced, for example, by affecting the nitration of quebrachitol, derived, for example, from quebracho bark or rubber latex, by the usual method using mixed nitric and sulphuric acids. When nitration is complete the mixture of product and nitrating acids is run into a separator where the quebrachitol nitrate will separate out in an oily layer, which is skimmed off and drowned in cold water. The nitrated product, which is thick and sticky, is then neutralized by dissolving in ether and emulsifying with sodium carbonate solution. The two solutions are then separated, for example, by means of a separating funnel and the ether evaporated off under vacuum, leaving the neutral quebrachitol nitrate.

The reaction in the formation of quebrachitol nitrate may be shown as follows:

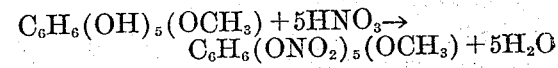
$$C_6H_6(OH)_5(OCH_3) + 5HNO_3 \rightarrow$$
$$C_6H_6(ONO_2)_5(OCH_3) + 5H_2O$$

Quebrachitol-glycerin nitrate may be produced by nitrating, in the usual manner, a mixture of quebrachitol and, for example, "R" glycerin, or equivalently a glycol. The nitrated product will separate from the nitrating acids normally and may be readily neutralized with an alkali solution in the usual manner. The mixture for the production of quebrachitol-glycerin nitrate may include quebrachitol from about 5% to about 50% and glycerin or glycol from about 95% to about 50% or say preferably 20% quebrachitol and 80% glycerin or glycol.

As has been indicated, quebrachitol nitrate affords a desirable explosive for inclusion in explosive compositions, for example, as a substitute for nitroglycerin in whole or in part in smokeless powder, as does also the quebrachitol-glycerin, or glycol nitrate, which is an advantageous ingredient for dynamites.

As an illustration of an explosive composition including, for example, 20% quebrachitol-glycerin nitrate, the following formula discloses a desirable dynamite:

| | Per cent |
|---|---|
| 20% quebrachitol-glycerin nitrate | 40 |
| Sodium nitrate | 46 |
| Pulp (wood meal) | 9 |
| Sawdust | 4 |
| Chalk | 1 |
| | 100 |

It will be understood that where in the claims appended hereto reference is made to glycerin that I intend to include glycols as equivalents of glycerin.

What I claim and desire to protect by Letters Patent is:

1. As a new composition of matter quebrachitol nitrate.

2. As a new composition of matter quebrachitol-pentanitrate.

3. A a new composition of matter a nitrated mixture of quebrachitol and glycerin.

4. An explosive including quebrachitol nitrate and a carbonaceous material.

5. An explosive including quebrachitol nitrate, an oxidizing salt and carbonaceous material.

6. An explosive including a nitrated mixture of quebrachitol and glycerin and a carbonaceous material.

7. An explosive including a nitrated mixture of quebrachitol and glycerin, an oxidizing salt and a carbonaceous material.

8. The nitration product of a mixture of 20% quebrachitol and 80% glycerin.

9. An explosive including a nitrated mixture of quebrachitol and glycerin, sodium nitrate and a carbonaceous material.

10. An explosive including the nitration product of a mixture of 20% quebrachitol and 80% glycerin, sodium nitrate and a carbonaceous material.

11. A low freezing dynamite containing as an ingredient nitrated quebrachitol.

In testimony of which invention, I have hereunto set my hand, at Kenvil, N. J., on this 28th day of June, 1929.

WILLARD DE C. CRATER.